United States Patent [19]

Schleimann-Jensen et al.

[11] Patent Number: 4,714,214
[45] Date of Patent: Dec. 22, 1987

[54] APPARATUS FOR PRODUCING BIAXIAL TILTABLE SUPPORT FOR A ROTATIONAL BODY

[75] Inventors: Lars J. Schleimann-Jensen, Danderyd; Fred H. E. Anderson, Järfälla, both of Sweden

[73] Assignee: U.S. Philips Corporation, New York, N.Y.

[21] Appl. No.: 865,223

[22] Filed: May 20, 1986

[30] Foreign Application Priority Data

May 22, 1985 [SE] Sweden .............................. 8502509-6

[51] Int. Cl.[4] .................. F42B 15/02; G01C 19/06
[52] U.S. Cl. ..................................... 244/3.16; 74/5.7; 244/3.15
[58] Field of Search ................. 244/3.15, 3.16, 3.19, 244/3.2; 74/5.7; 248/583

[56] References Cited

U.S. PATENT DOCUMENTS

| | | | |
|---|---|---|---|
| 3,438,270 | 4/1969 | Binder et al. | 74/5.47 |
| 3,982,714 | 9/1976 | Kuhn | 244/3.16 |
| 4,036,453 | 7/1977 | Evans et al. | 244/3.16 |
| 4,339,097 | 7/1982 | Kordulla et al. | 244/3.16 |
| 4,600,166 | 7/1986 | Califano et al. | 244/3.16 |

FOREIGN PATENT DOCUMENTS 1406578  5/1974  Fed. Rep. of Germany .

Primary Examiner—Charles T. Jordan
Attorney, Agent, or Firm—Emmanuel J. Lobato

[57] ABSTRACT

The invention relates to apparatus for producing biaxial tiltable support for a rotational body each as a rotating mirror or antenna included in a target seeker mounted at the nose of a projectile. The rotatable element is supported by a bearing body, as a spherical ball, which is placed in a corresponding spherical recess in a stationary part fixedly mounted to the projectile. The ball is supported by air or liquid in its recess so that it can perform both rotational motion about a spin axis and angular deflection motions about turning axes lying in a plane, which is perpendicular to the spin axis. According to the invention the angular deflection of the ball about the turning axes is controlled by means of magnetic fields. The magnetic fields are produced by magnetic yokes having coils. The yokes are terminated by magnetic poles situated at the surface of the spherical recess and cooperate with a magnetic part of the ball.

20 Claims, 6 Drawing Figures

APPARATUS FOR PRODUCING BIAXIAL TILTABLE SUPPORT FOR A ROTATIONAL BODY

The invention relates to an apparatus for biaxial tiltable support of a body having a spherical or partly spherical outer contour, for example a body which is itself rotatable about a spin axis or carries an element which is rotatable about a spin axis, so that the body can be brought to perform controlled tilting motions about two mutually perpendicular axes. The body is arranged in a recess in a stationary part having a corresponding spherical shape. Means are arranged for maintaining a small gap between the spherical surfaces of the body and the recess, and means are further arranged for producing torques on the body about the perpendicular axes.

Apparatus of this kind has the body itself performing a spinning rotation in its spherical recess, as is known in DE-OS No. 29 21 228, corresponding to U.S. Pat. No. 4,339,097. The apparatus is included as a part of a target seeker mounted at the nose of a projectile. Means for continuously feeding compressed air maintains the gap between the spherical body and the spherical recess. The gap allows the rotation and tilting motions of the body.

A torque generator which can be used to transfer torque to such a rotating body is known by DE-PS No. 14 06 578. The torque generator consists of a permanent magnet, connected to the body and extended perpendicular to the spin axis of the body, and a surrounding electric coil. The coil is fed with an ac signal which varies in frequency with the rotation of the body, the phase position of this ac signal fed to the coil determining the direction of the tilting deflection of the body. The ac signal is derived from the radiation of a target detected by the rotating scanning system and is led to the coil with such a phase, that the centrum for the rotating system is kept directed towards the target.

In another apparatus of a similar kind, the body rotates about a spin axis at the same time as the body is also tilted at small deflection angles with respect to two mutually perpendicular axes relative to the spin axis, as described by DE-OS No. 1 623 441, to which U.S. Pat. No. 3,438,270 corresponds. The body is in this case mechanically supported by a rotatable shaft via a universal joint, allowing the small tilting motions. Torques are transferred to the rotatable body by means of a magnetic mechanism, which comprises a permanent magnetic ring mounted on the rotatable body and electrical windings mounted on the stationary part for cooperation with the magnetic ring. The ring is radially magnetized and the windings, each covering only a part of the circumference, are arranged pairwise diametrically opposite each other. The windings of one pair producing tilting motion about one axis and the windings of the second pair producing tilting motion about the second axis.

The object of the present invention is to provide apparatus for producing biaxial tiltable support for a rotational body, in which the torque producing means transfers higher torques to the tiltable body than the prior art arrangements for a given size and a given electric power dissipation.

According to the invention the object is achieved on such apparatus by a torque producing means comprising magnetic yokes arranged in the stationary part and having electrical windings. The yokes terminate in magnetic poles situated on the inner spherical surface of the recess, the magnetic poles for one yoke being situated substantially diametrically opposite each other. The body comprises parts of magnetic material terminating at the outer surface of the body for forming return path for the magnetic flux in the yokes. The interconnecting line between the centers of the two magnetic poles belonging to one yoke are arranged obliquely relative to a centrum plane through the magnetic parts at the surface of the body. Each pole centrum is situated on either side of the plane, in a non-deflected position of the body, so that torques can be transferred to the body by cooperation between the magnetic poles and the parts of magnetic material as a result of selective activation of the electrical windings of the magnetic yokes.

The high torques can be produced in the present invention because the magnetic path for each yoke is substantially closed via the magnetic parts of the body, resulting in a high magnetic flux in combination with each yoke being terminated in poles lying substantially diametrically opposite each other, so that each yoke will produce two cooperating torques acting at the surface of the body. The high torques are obtained at the cost of a certain dependency of the resulting torque on the instantaneous tilting deflecting angle of the body. For example, the resulting torque decreases with increasing tilting deflecting of the body from the neutral non-deflected position. However, the produced resulting torque can be accurately calculated as function of the tilting deflecting angle to produce embodiments of the invention having a desired level of precision.

A preferred embodiment of the invention is characterized wherein the torque producing means for each axis comprises two magnetic yokes, one yoke being arranged obliquely in one direction relative to the plane in a non-deflected position of the body for producing a torque in one direction about the relevant tilting axis and the other yoke being arranged obliquely in the opposite direction relative to the plane for producing a torque in the opposite direction about the same axis.

At the surface the magnetic parts of the movable body suitably form an equatorial portion of the spherical surface. According to a further characterizing feature for the invention they can comprise a disc-shaped part of soft magnetic material in a body, the remaining material being non-magnetic.

In order to reduce eddy current losses the body rotates in its recess, the disc-shaped magnetic part can be composed by lamella of soft magnetic material.

The invention is illustrated by means of example with reference to the accompanying drawing.

Figure 1:
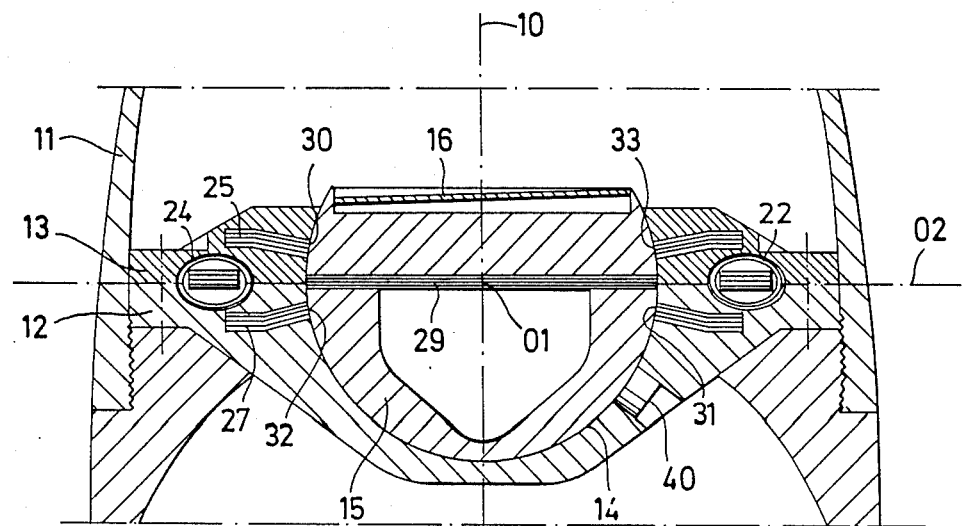
FIG. 1 shows a longitudinal sectional view through a projectile with a first embodiment of a supporting arrangement according to the invention.
Figure 2:
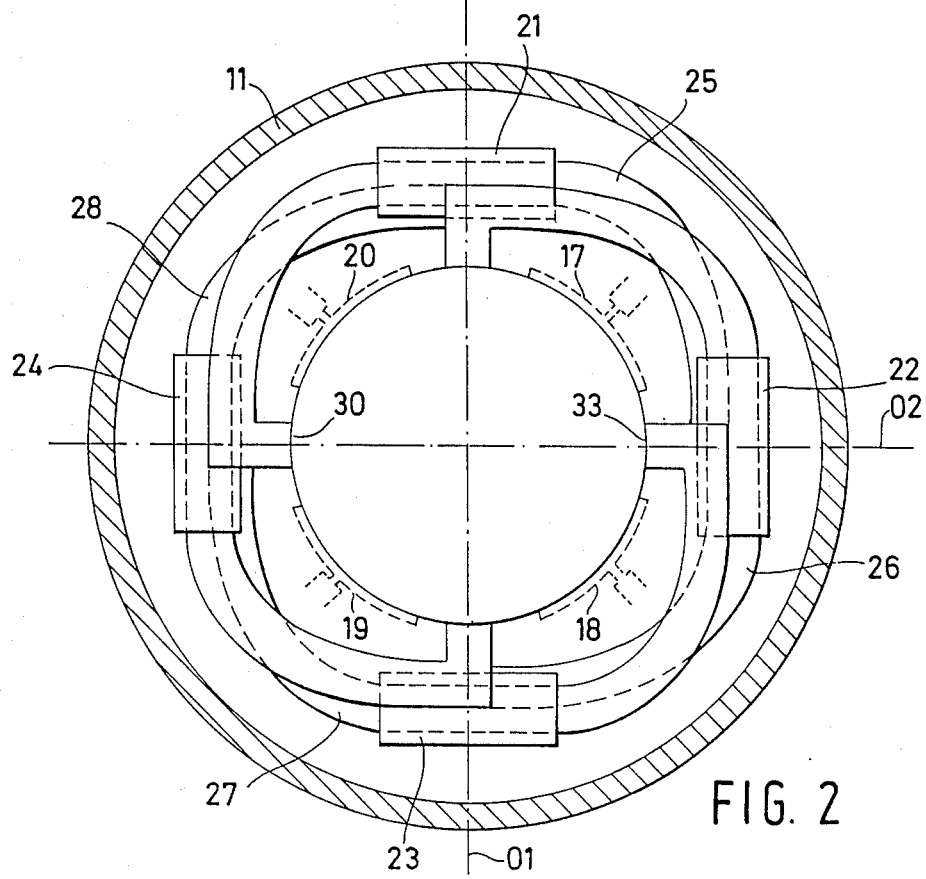
FIG. 2 shows a sectional view through the projectile and the supporting arrangement according to FIG. 1 with parts of the stationary portion of the supporting arrangement removed for illustrating the magnetic system.

In FIGS. 1 and 2 a projectile envelope 11 has a projectile axis 10. A two-part bearing box 12, 13 is fixedly mounted in envelope 11, defining a spherical recess 14. A part-spherical body or ball 15 is situated in a recess 14. The recess 14 encloses somewhat more than a semisphere and will thereby retain ball 15 in itself. The open end of recess 14 is directed forward, as seen in the motion direction of the projectile, and at this open end a part of ball 15 projects from recess 14. At this projecting part of ball 15 a mirror 16 is mounted such that its normal axis forms a small angle with the rotationally symmetric axis of the ball. The mirror 16 cooperates with means (not shown) for transmission and reception of electro-magnetic radiation, e.g. IR radiation. The whole arrangement may be included in a target seeker which during the search phase can operate according to the conical scanning principle, wherein the mirror supporting body 15 must be turnable and accurately adjustable about two mutually perpendicular directions, in the drawing designated with 01 and 02. Superimposed on the conical or helical scanning, a sensing lobe will perform a rapid rotation with small amplitude, which is a result of the oblique setting of the mirror in combination with rapid rotation of the body about its own rotary symmetric axis.

In order to allow both the rapid rotation and the controlled angular deflections, ball 15 is air-supported in spherical recess 14. This can be achieved by means of elongated slots in the two bearing parts 12 and 13 evenly distributed along the circumference. As shown in FIG. 1 the number of slots in each part 12, 13 is four, for part 12 slots 17–20 are indicated by dashed lines. The slots 17–20 in part 12 are situated a small distance below the plane perpendicular to projectile axis 10, and passing through the centrum of spherical recess 14. The corresponding slots in the second bearing part 13 are situated a small distance above the plane. All the slots are connected via restrictions to a source for compressed air (not shown). This will produce a stable air bearing with an air cushion surrounding the whole surface of ball 15.

Turning and setting of the ball 15 about the axes 01, 02 is effected in an electro-magnetic manner by means of four coils 21, 22, 23, 24. Each is arranged on a U-shaped yoke 25, 26, 27, 28. A disc-shaped part 29 of ball 15 is made of soft magnetic material, the ball otherwise consists of non-magnetic material. Each magnetic yoke 25–28 encloses 180° and is terminated by two pole shoes or poles lying diametrically opposite each other on the spherical inner surface of recess 14. One pole of each pair is a small distance above the turning plane 01, 02 extending through the centrum of recess 14, and the other pole is a small distance below the plane. Thus, in FIGS. 1 and 2 yoke 25 of coil 21 is terminated by a pole 30 at the left hand side situated a distance above the turning plane, and a pole 31 at the right hand side situated below the plane. The yoke 27 of coil 23 is terminated by a pole 32 at the left hand side situated below the turning plane, and by a pole 33 at the right hand side situated above the plane. As shown rest position of the ball 15 the soft magnetic disk 29 is situated half-way between the poles. The thickness of disk 29 at the surface of ball 15 is in the example shown in FIG. 1 smaller than the distance between the poles at the spherical inner surface, so that air gaps will be formed between the poles and the disk. When a coil is excited a magnetic field is produced which passes through the respective yoke and through the soft magnetic disk 29 via the air gap. This will result in a magnetic attraction force on the disk 29 in direction to a respective pole, which force tends to shorten the air gap. Excitation of coil 21 with yoke 25 and poles 30, 31 thus will produce a turning deflection of ball 15 about the axis 01 in clock-wise direction and excitation of coil 23 with yoke 27 and poles 32, 33 will produce a turning deflection about the same axis in counter-clock-wise direction. In the same manner, yokes 26, 28 of coils of 22, 24 are terminated by poles situated on each side of the turning plane and excitation of the said coils 22, 24 will produce a turning deflection of ball 15 in the one and the other direction about axis 02.

Figure 3:
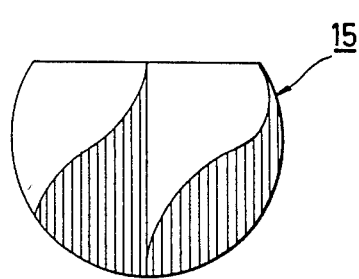
FIG. 3 shows a side view of the spherical body or the ball with black-painted sections in order to enable optical detection of the deflection angle and rotational speed.

In many applications it is a requirement to be able to measure both the turning deflection angle of the ball and its rotational speed. This can be effected in a contact-free manner by capacitive, inductive or optical measurements. In the present example it is assumed that measuring of the deflection angle and rotational speed is effected optically by means of a unit 40 containing both a light source and sensor. In order to admit the optical measurement the ball is provided with a pattern of dark and light fields. An example on such a pattern is shown in FIG. 3. In this example the quantity of dark portions (or light portions) per revolution of the ball will be different for different angular deflection angles and can be used as a measure on deflection angle. The rotational speed is represented by the frequency at which the dark or light fields appear.

In the example shown there is one single movable body, namely ball 15, performing both the slow conical deflection and the rapid rotation of the scanning lobe. In order to ensure that the rapid rotation of the ball in this case does not result in too large eddy current losses disk 29 may consist of a package of soft-magnetic lamella.

Figure 4:
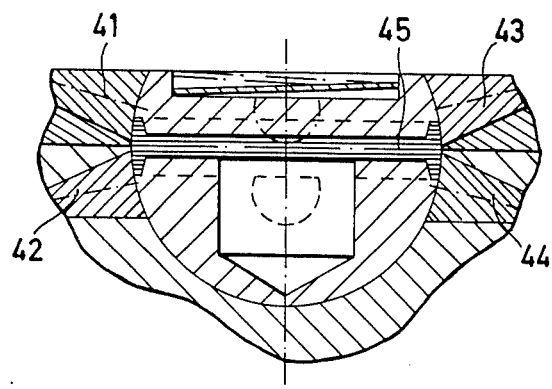
FIG. 4 shows a longitudinal sectional view, similar to the view in FIG. 1 through the supporting arrangement with an alternative embodiment of the magnetic system.

The system shown in FIGS. 1 and 2 is non-linear, that is the produced torque is not proportional to applied current. Furthermore, produced torque varies for a certain current with the deflection angle. In order to decrease the variation different meassures can be taken. One possibility is to give the soft iron lamella in the disk 29 a suitable shape. An example of a suitable shape of the lamella is shown in FIG. 4. Another possibility is to make the ball open at the bottom and to place the electro-magnets on a projectile-fixed stand within the ball. This is made in order to decrease the distance between the electro-magnets and the soft iron body in deflected condition. A further possibility is to provide the system with several electro-magnets, which are made effective in successive order in order to turn the field more gradually.

The function of the device is as follows.

Upon firing of the projectile it is brought to perform a rapid rotation. By the high axial acceleration the ball 15 is pressed against the spherical recess 14 in the projectile-fixed part 12 and is mechanically locked to the projectile. Thereby the ball is brought to rotate with the same rapid rotation as the projectile. When the acceleration ceases the ball will be free and the air bearing is now made effective by supply of compressed air. At a given point of the trajectory of the projectile wings are swung outwards for braking the rotation of the projectile so that the rotation ceases. As a result of the air bearing and its own inertia the ball will continue to rotate without noticeable reduction of its rotational speed. At a later position of the trajectory the target seeking function is made effective, inter alia involving that periodically varying currents are fed from a function generator to the coils 21–24. The current is varied in such manner that the ball 15, for example, performs a conical scanning of the target area in front of the projectile with continuously decreasing amplitude. The current function is predetermined by calculation beforehand with knowledge of the ratio between the deflection angle and the current through the coils. If desired the current supply to the coils can be effected in a closed-loop regulation circuit by means of information about the deflection angle obtained from the measuring unit 40.

A first modification of the magnetic system is shown in FIG. 4. In this case the fixed magnetic poles 41, 42, 43, 44 have a larger extension than the soft magnetic part 45 of the ball at the surface, which soft magnetic part in turn is wider than the distance between the poles so that in the rest position of the ball the soft magnetic part 45 already overlaps the poles. In fully deflected condition of the ball substantially the entire soft magnetic part of the ball has arrived to a position opposite a magnetic pole. This construction is made in order to decrease the variation of the current with the deflection angle.

Figure 5:
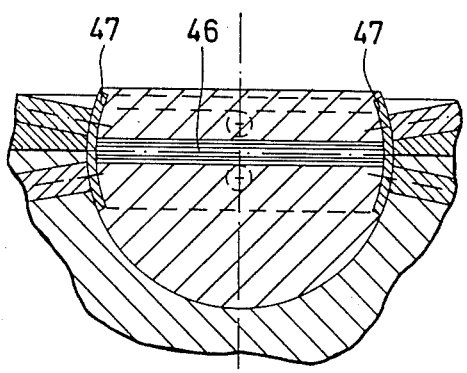
FIG. 5 shows a similar longitudinal sectional view of a supporting arrangement with another embodiment of the magnetic system.

A further modification of the magnetic system is shown in FIG. 5. In this case the soft magnetic part 46 of the ball is at the surface terminated by a ring 47 of magnetic material, which has larger extension than the entire fixed system of opposing poles. The air gap area is maintained constant and instead the magnetic reluctance is varied as a function of the paths through the magnet material of the ball. In order to obtain a larger torque for a given applied current the soft magnetic ring 47 should be made of a material having lower magnetic conductance than the central part 46.

Figure 6:
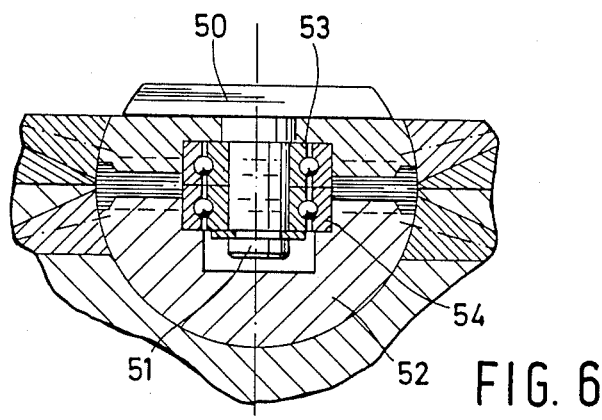
FIG. 6 shows a longitudinal sectional view through an embodiment of a supporting arrangement according to the invention, in which case the ball does not need to rotate about the spin axis.

A second embodiment of the supporting arrangement according to the invention is shown in FIG. 6. The mirror 50 is in this case connected to a shaft 51, which is rotatably mounted in the ball 52 by means of two ball bearings 53, 54. In this case only the mirror 50 rotates with the rapid rotational speed, while the ball 52 can be stillstanding or rotating slowly.

A number of modifications of the described embodiments are possible within the scope of the invention. Thus, the magnetic circuits may also comprise permanent magnets. If, for example, certain magnetic poles in the fixed part are replaced by permanent magnetic poles the number of coils can be reduced. A system with several coils which are made effective in successive order at increasing deflection angles is also possible. The air bearing can be achieved in an arbitrary manner, e.g. by means of spiral groove bearings, in which case no supply of compressed air is required. Instead of air a thin film of a suitable liquid can also be enclosed in the gap between the two spherical surfaces for supporting of the movable ball. If driving is required this may for example be effected by means of air direct on the ball.

What is claimed is:

1. Apparatus for producing biaxial tiltable support of a rotational body comprising:
    a rotational body having an at least partly outer spherical surface portion;
    a stationary part having a recess therein with an inner spherical surface portion substantially corresponding to the outer spherical surface portion of said rotational body, said body being rotationally disposed in said stationary part on a spin axis;
    means for maintaining a small gap between the inner and outer spherical surface portions of said stationary part and said rotational body respectively;
    torque producing means being arranged about said rotational body for producing torques on said body causing controlled tilting thereof with respect to two mutually perpendicular turning axes normal to said spin axis;
    the improvement characterized in that said torque producing means comprises:
    a plurality of magnetic yokes in said stationary part, electrical windings being on each of said yokes, each of said yokes having magnetic poles at its ends, each of said poles being situated on the inner spherical surface portion of the recess of said stationary part and being substantially diametrically opposite one another;
    said rotational body comprising a part of magnetic material terminating at the outer surface portion of said body for forming return paths for magnetic flux flowing between each of said poles of each respective one of said plurality of yokes, the magnetic part having a center plane passing through it; and
    each of the poles of said respective one of said plurality of yokes being arranged obliquely relative to the center plane of the magnetic part with respective opposing poles situated on an opposite side of the center plane in a non-deflected position of said body;
    whereby in response to selective activation of the electrical windings of said plurality of yokes, by cooperation between the magnetic poles of the yokes and the magnetic part of said body, torques are transferred to said body producing controlled tilting of said body with respect to the mutually perpendicular turning axes.

2. An apparatus as claimed in claim 1, characterized in that the torque producing means for each axis comprises two magnetic yokes, one yoke being arranged obliquely in one direction relative to said plane in a non-deflected position of the body for producing a torque in one direction about the relevant tilting axis and the other yoke being arranged obliquely in the opposite direction relative to said plane for producing a torque in the opposite direction about the same axis.

3. An apparatus as claimed in claim 2, characterized in that the magnetic parts of the body at the surface form a substantially equatorial portion of the spherical surface.

4. An apparatus as claimed in claim 3, characterized in that the magnetic parts of the tiltable body comprise a disc-shaped part of soft magnetic material in a body which for the rest is non-magnetic.

5. An apparatus as claimed in claim 4, characterized in that the disc-shaped part is composed by lamella of soft magnetic material.

6. An apparatus as claimed in claim 2, characterized in that the magnetic parts of the tiltable body comprise a disc-shaped part of a soft magnetic material in a body which for the rest is non-magnetic.

7. An apparatus as claimed in claim 6, characterized in that the disc-shaped part is composed by lamella of soft magnetic material.

8. An apparatus as claimed in claim 1, characterized in that the magnetic parts of the tiltable body comprise a disc-shaped part of a soft magnetic material in a body which for the rest is non-magnetic.

9. An apparatus as claimed in claim 8, characterized in that the disc-shaped part is composed by lamella of soft magnetic material.

10. An apparatus as claimed in claim 1, characterized in that the magnetic parts of the body at the surface form a substantially equatorial portion of the spherical surface.

11. An apparatus as claimed in claim 10, characterized in that the magnetic parts of the tiltable body comprise a disc-shaped part of a soft magnetic material in a body which for the rest is non-magnetic.

12. An apparatus as claimed in claim 11, characterized in that the disc-shaped part is composed by lamella of soft magnetic material.

13. Apparatus for producing biaxial tiltable support of a body comprising:
a body having an at least partly outer spherical surface portion;
a stationary part having a recess therein with an inner spherical surface portion substantially corresponding to the outer spherical surface portion of said body, said body being disposed in said stationary part on a spin axis;
means being arranged for maintaining a small gap between the inner and outer spherical surface portions of said stationary part and said body respectively;
torque producing means being arranged about said body for producing torques on said body causing controlled tilting thereof with respect to two mutually perpendicular turning axes normal to the spin axis;
the improvement characterized in that said torque producing means comprises
four magnetic yokes in said stationary part, electrical windings being on each of said yokes, each of said yokes having a pair of magnetic poles at its opposing ends, each of said poles being situated on the inner spherical surface portion of the recess of said stationary part and being substantially diametrically opposite one another;
said body comprising a part of magnetic material terminating at the outer surface portion of said body for forming return paths for magnetic flux flowing between each of said poles of each of said pair of yokes, the magnetic part having a center plane passing through it, which is substantially transverse to said spin axis in the non-deflected position of said body;
each of the poles of a first pair of said yokes being arranged obliquely relative to the center plane of the magnetic part with respective opposing poles situated on an opposite side of the center plane in a non-deflected position of said body, each of the poles of a second pair of said yokes also being arranged obliquely relative to the center plane of the magnetic part with respective opposing poles situated on an opposite side of the center plane in a non-deflected position of said body, the poles of said first pair of yokes being arranged along a connecting line substantially perpendicular to the poles of said second pair of yokes also being arranged along a connecting line;
whereby in response to selective activation of the electrical windings of said yokes, by cooperation between the magnetic poles of said yokes and the magnetic part of said body, torques are transferred to said body producing controlled tilting of said body with respect to the mutually perpendicular turning axes.

14. An apparatus as claimed in claim 13, characterized in that the magnetic parts of said body are formed on a substantially equatorial portion of the outer spherical surface portion.

15. An apparatus as claimed in claim 14, characterized in that the magnetic parts of the tiltable body comprise a disc-shaped part of soft magnetic material in a body which for the rest is non-magnetic.

16. An apparatus as claimed in claim 15, characterized in that the disc-shaped part is composed by lamella of soft magnetic material.

17. Apparatus for producing biaxial tiltable support of a body comprising:
a body having an at least partly outer spherical surface portion, and carrying a rotational element rotatable about a spin axis;
a stationary part having a recess therein with an inner spherical surface portion substantially corresponding to the outer spherical surface portion of said body, said body being disposed in said stationary part;
means for maintaining a small gap between the inner and outer spherical surface portions of said stationary part and said body respectively;
torque producing means being arranged about said body for producing torques on said body causing controlled tilting thereof with respect to two mutually perpendicular turning axes normal to said spin axis;
the improvement characterized in that said torque producing means comprises:
a plurality of magnetic yokes in said stationary part, electrical windings being on each of said yokes, each of said yokes having magnetic poles at its ends, each of said poles being situated on the inner spherical surface portion of the recess of said stationary part and being substantially diametrically opposite one another;
said rotational body comprising a part of magnetic material terminating at the outer surface portion of said body for forming return paths for magnetic flux flowing between each of said poles of each respective one of said plurality of yokes, the magnetic part having a center plane passing through it; and
each of the poles of said respective one of said plurality of yokes being arranged obliquely relative to the center plane of the magnetic part with respective opposing poles situated on an opposite side of the center plane in a non-deflected position of said body;
whereby in response to selective activation of the electrical windings of said pluraltiy of yokes, by cooperation between the magnetic poles of the yokes and the magnetic part of said body, torques are transferred to said body producing controlled tilting of said body with respect to the mutually perpendicular turning axes.

18. An apparatus as claimed in claim 17, characterized in that the magnetic parts of said body are formed on a substantially equatorial portion of the outer spherical surface portion.

19. An apparatus as claimed in claim 18, characterized in that the magnetic parts of the tiltable body comprise a disc-shaped part of soft magnetic material in a body which for the rest is non-magnetic.

20. An apparatus as claimed in claim 19, characterized in that the disc-shaped part is composed by lamella of soft magnetic material.

* * * * *